United States Patent
Miyata

(10) Patent No.: US 7,259,770 B2
(45) Date of Patent: Aug. 21, 2007

(54) METHOD AND APPARATUS FOR PROCESSING INFORMATION

(75) Inventor: Junichi Miyata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 419 days.

(21) Appl. No.: 10/977,287

(22) Filed: Oct. 28, 2004

(65) Prior Publication Data

US 2005/0134887 A1 Jun. 23, 2005

(30) Foreign Application Priority Data

Nov. 18, 2003 (JP) ............................ 2003-388478

(51) Int. Cl.
*G09G 5/00* (2006.01)
*B41B 15/00* (2006.01)

(52) U.S. Cl. ..................... 345/620; 358/1.13
(58) Field of Classification Search ................ 345/620, 345/621, 625, 626, 627, 628; 358/1.13
See application file for complete search history.

(56) References Cited

U.S. PATENT DOCUMENTS 5,642,474 A * 6/1997 Parkhurst et al. .......... 358/1.18
5,717,840 A * 2/1998 Pardo ......................... 358/1.13
2003/0011819 A1 1/2003 Toda

FOREIGN PATENT DOCUMENTS

| JP | 8-230245 A | 9/1996 |
|---|---|---|
| JP | 8-328774 A | 12/1996 |
| JP | 10-187376 A | 7/1998 |

* cited by examiner

*Primary Examiner*—Ryan Yang

(57) ABSTRACT

A printer driver generates output data adapted to the processing power of a printer. When the printer driver receives a draw command from an operating system, a complexity value of the draw command is calculated depending on the type of the command and/or the number of contour points of a clipping area included as a parameter of the command. A processing mode is selected depending on the complexity relative to first and second threshold values. In a first processing mode, a draw command to draw image data and a clip command are simply output. In a second processing mode, a draw command to draw image elements generated in accordance with a clip command is output. In a third processing mode, mask data is generated from a clip command, and a command to calculate the logical AND between image data and the mask data is output.

10 Claims, 11 Drawing Sheets

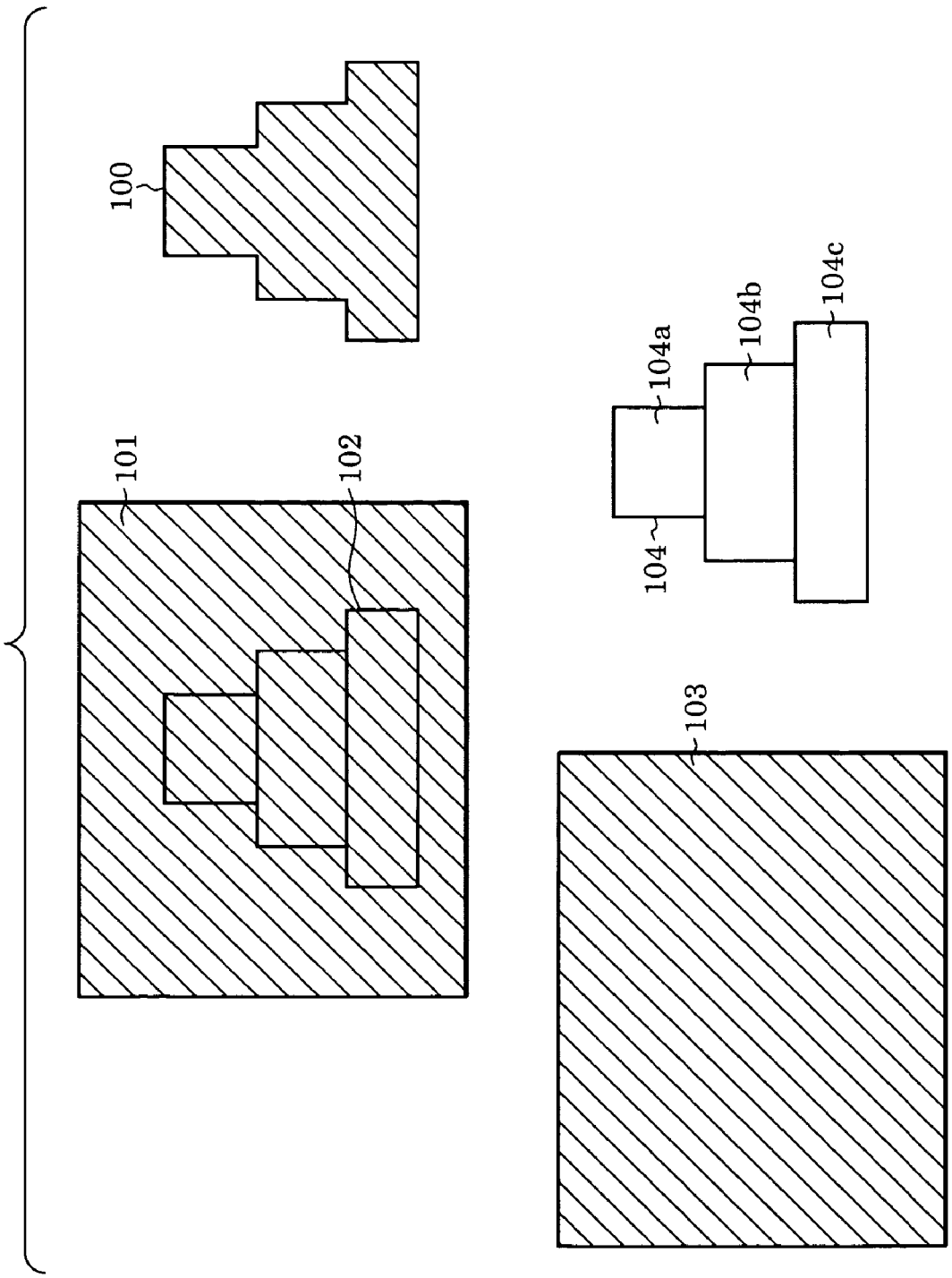

METHOD AND APPARATUS FOR PROCESSING INFORMATION

This application claims priority from Japanese Patent Application No. 2003-388478 filed Nov. 18, 2003, which is hereby incorporated by reference herein.

BACKGROUND OF THE INVENTION

1. Field of the Invention

The present invention relates to a method and apparatus for processing information, capable of maintaining a high processing efficiency even when outputting complicated data, without causing a significant increase in processing complexity.

2. Description of the Related Art

A printing control method and a printing process used in a conventional printing system are described below. A printer and a general-purpose information processing apparatus, such as a personal computer (hereinafter, referred to as a host computer), are generally connected to each other via a Centronics parallel interface, a RS-232C serial interface, a USB (Universal Serial Bus) interface, or a network interface.

In the host computer, application software (hereinafter, referred to simply as an application), such as a word processor or a spreadsheet program, runs on basic software (called an operating system (OS)), such as a Microsoft® Windows® OS (e.g., Windows® 2000, Windows ME®, etc.). When printing is performed by an application, the application program calls a function of a graphic subsystem that is one of subsystems provided by the operating system. The graphic subsystem is responsible for processing image information to be supplied to a display or a printer. In the Microsoft® Windows® operating systems, the graphic subsystem is called a GDI (Graphic Device Interface). In order to handle differences among devices, such as a display or a printer, a module called a device driver is dynamically linked to the GDI, and outputting of data to a specific device is performed via the device driver. A module for use with a printer for the above purpose is called a printer driver. The printer driver has a DDI (Device Driver Interface) that is a set of functions implemented in a device driver to achieve necessary capabilities. When the GDI receives an API (Application Programming Interface) call from an application, the GDI converts the API call into a form adapted to the printer driver and calls a DDI function to perform a printing process. As described above, the GDI sequentially handles print commands received from an application via the printer driver.

Printer drivers can be classified into two types according to the purpose of use: (1) output-to-printer drivers; and (2) output-to-file drivers. An output-to-printer driver is used to output data to a printer having a controller capable of handling control commands described in PDL (Printer Description Language). When the output-to-printer driver receives a draw command from a system via a DDI function, the output-to-printer driver converts the received draw command into a command described in PDL and outputs the command to a printer, which in turn performs printing according to the received command.

An output-to-file driver is used not to send data directly to a printer but to convert a draw command received from a DDI function into a predefined intermediate format and store the result as an intermediate file on a disk system of the host computer. Two widely used intermediate formats are PDF (Portable Document Format) and SVG (Scalable Vector Graphics). An intermediate file stored on the file system of the host computer can be displayed on the host computer using a particular application program capable of handling the intermediate format. If a user issues a command to print the intermediate file, the intermediate file is supplied to the printer via the graphic subsystem, and the printer performs printing.

DDI functions can be classified into three types: (1) logical draw commands associated with text data; (2) logical draw commands associated with graphics data; and (3) logical draw commands associated with image data. In the following discussion, DDI functions associated with image data used in the Microsoft Windows® system are used as examples. The following discussion can also be applied to logical draw commands associated with text data or graphics data. In general, a logical draw command draws an image in a clipping area that defines a valid drawing area in accordance with drawing attribute specified by an application.

For example, when an image 100 shown in FIG. 1A is drawn, a draw command including image data and a clipping area is used as described below. In the example shown in FIG. 1A, the image 100 is drawn by a draw command including, as parameters, image data 101 and a clipping area 102. Note that only the image data 101 and the clipping area 102, which are parameters of the draw command, are shown in FIG. 1A, and the draw command itself is not shown. The image data 101 represents one sheet of rectangular image denoted by hatching. The clipping area 102 represents a valid image area specified by an application. In this case, the draw command including the image data 101 and the clipping area 102 indicates that an image should be generated by clipping the image data 101 with the clipping area 102.

In the conventional technique, when an application specifies a clipping area of image data and prints an image using a graphic subsystem, the printer driver outputs image data and the specified clipping area in accordance with a draw command received via a DDI function from the application. That is, in general, the printer driver outputs a draw command to output an image such as the image 103 and a clip command that defines a clipping area such as the clipping area 104.

A high-performance graphic subsystem is now available which allows an application to represent a complicated image with high resolution and with good halftone. In some complicated image data, the printer driver has to handle a clipping area including as many as 10,000 or more points in a coordinate space of a 600-dpi printer. Although great advances have been made in performance of personal computers and printers, a complicated draw command output by a printer driver can cause a processing system, such as a printer or an application, to have a large processing load that can cause a significant reduction in performance, for example as disclosed in Japanese Patent Laid-Open No. 2003-029938.

As described above, when a logical draw command is received from a DDI, if a received source image such as the image 101 and clipping area such as the clipping area 102 are directly output as image data 103 and clipping area data 104, the data output from the printer driver includes a great number of coordinate points when the clipping area of the image is complicated. This causes a large processing load to be imposed on a processing system (for example, a command interpreter or a renderer of a printer or a graphic engine of a computer) that handles the data received from the printer driver, and a significant reduction can occur in performance of a printing system as a whole.

SUMMARY OF THE INVENTION

In view of the above, in an aspect, the present invention provides an information processing apparatus comprising: an input unit for inputting an image draw command including a clipping area; and a generation unit for generating data based on the image draw command input by the input unit, the data including first data including image data and clipping area data or second data including clipped image data.

In another aspect, the present invention provides an information processing apparatus comprising: an input unit for inputting an image draw command including a clipping area; and a generation unit for generating data based on with the image draw command input via the input unit, the data including first data including image data and clipping area data or third data including image data and mask data indicating an area to be masked other than a clipping area.

In another aspect, the present invention provides an information processing apparatus for generating data in a predetermined format in accordance with a logical draw command. The information processing apparatus comprises: complexity determination means for determining complexity of the logical draw command, on the basis of the logical draw command and associated one or more parameters thereof, and data generation means for, depending on the determined complexity, generating (1) first output data including a draw command defining a drawing area and a clipping area output command defining a clipping area, (2) second output data including a draw command to draw one or more rectangular areas constituting an image area obtained by clipping the drawing area with the clipping area, or (3) third output data including a draw command to mask the drawing area with mask data corresponding to an area other than the clipping area.

The complexity determination means may determine the complexity based on a constant corresponding to the type of the logical draw command or based on the number of contour points of the image clipping area included as a parameter in the logical draw command.

The data generation means may generate first output data when a complexity value is less than a first threshold value, second output data when the complexity value is equal to or greater than the first threshold value and less than a second threshold value, or third output data when the complexity value is equal to or greater than the second threshold value.

In another aspect, the present invention provides an information processing apparatus for generating data in a predetermined format in accordance with a logical draw command. The information processing apparatus includes: complexity determination means for determining complexity of the logical draw command such that a constant corresponding to the type of the logical draw command or the number of contour points of an image clipping area included as a parameter in the logical draw command is employed as the complexity, and data generation means for generating first output data including a draw command defining a drawing area and a clipping area output command defining a clipping area if a complexity value is less than a first threshold value, second output data including a draw command to draw one or more rectangular areas constituting an image area obtained by clipping the drawing area with the clipping area if the complexity value is equal to or greater than the first threshold value and less than a second threshold value, or mask data corresponding to an area other than the clipping area and further generating third output data including a draw command to draw an image obtained as the logical AND of the mask data and the drawing area if the complexity is equal or greater than the second threshold value.

Further features and advantages of the present invention will become apparent from the following description of the embodiments with reference to the attached drawings.

BRIEF DESCRIPTION OF THE DRAWINGS

FIG. 1A shows an example of a logical draw command output in an output process in a first mode.

DESCRIPTION OF THE EMBODIMENTS

Overview of the Invention

Figure 1B:
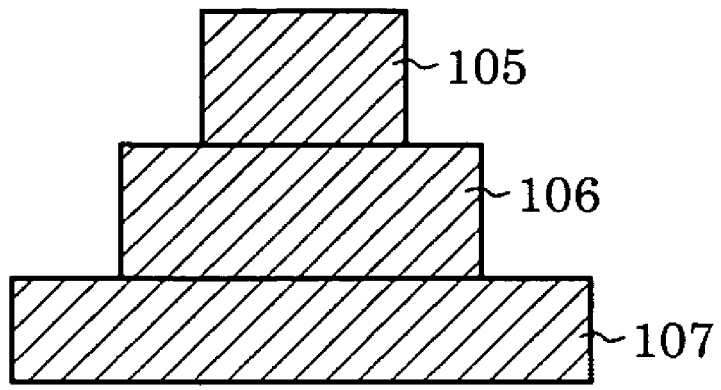
FIG. 1B shows an example of a logical draw command output in an output process in a second mode.

First, an overview of a printer driver according to the present invention is described. When the printer driver receives a source image and a clipping area from a DDI, the printer driver optimizes the clipping area using one of two techniques according to the present invention. In a first technique, clipping of an area specified by the DDI from the source image is performed in the printer driver, and an output image in a simplified form including no clipping area is generated. An example of an output image including a plurality of image elements 105, 106, and 107 is shown in FIG. 1B. In this example, the printer driver clips an image 103 with a clipping area 104 and outputs three image elements 105, 106, and 107 obtained as a result of the clipping. In this method, when the given image is simple and the clipping area is not complicated, the resultant output image includes no clipping area. In this regard, the output image is optimized.

However, in this first method, when a source image includes a great number of small clipping areas, output image data includes a great number of images, and thus it is needed to draw a great number of image objects, which can result in degradation in performance.

Figure 1C:
FIG. 1C shows an example of a logical draw command output in an output process in a third mode.
Figure 1C:
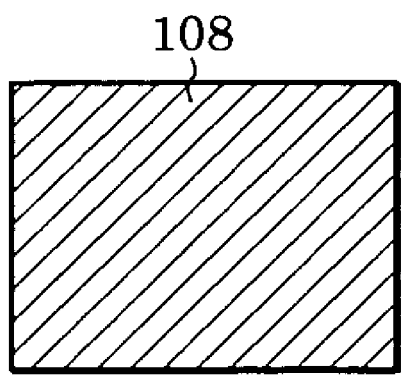
Figure 1C:
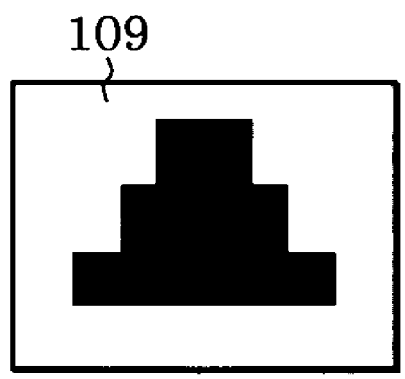

A second method of optimizing a clipping area according to the present invention is described below with reference to FIG. 1C. The printer driver generates bit mask data 109 discriminating the clipping area 104 from the other area and further generates a command (logical AND command) to mask the source image 108 with the mask data 109. The mask data 109 defines a mask area (black area in FIG. 1C) in a bit map image with the same size as that of the source image 103 other than a valid image area (that should remain without being masked) corresponding to the clipping area 104. The printer driver issues a command to mask the source image 103 with the mask data 109 such that the valid image area remains without being masked thereby achieving a desired output. More specifically, the mask data is generated so as to have a value of 1 for all valid image areas and a value of 0 for the mask area, and a command to calculate the logical AND of the source image 103 and the mask data 109 is output.

First Embodiment

Figure 2:
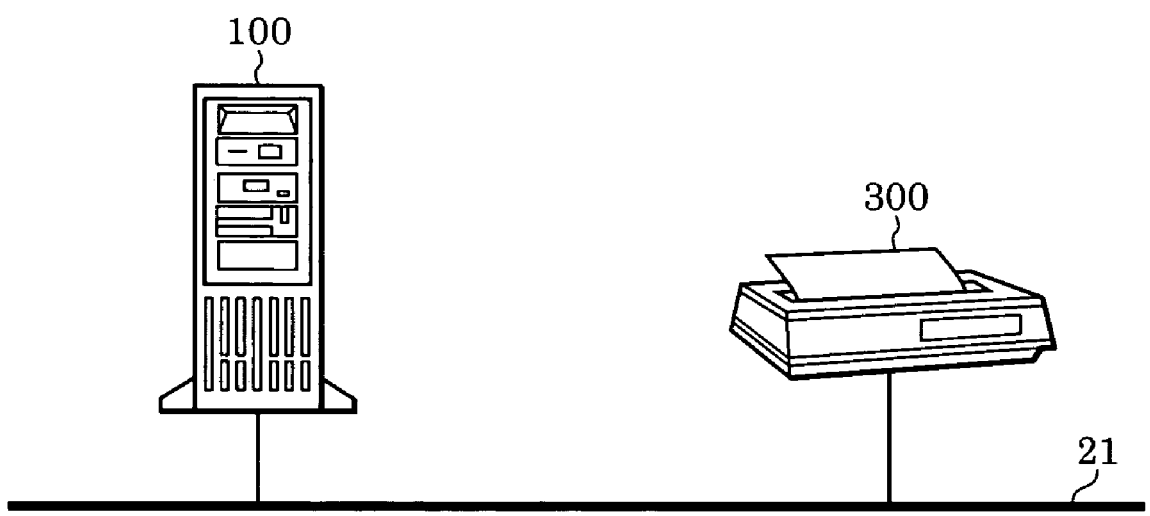
FIG. 2 is a diagram showing an example of a system according to the present invention.

The first method according to the present invention is described below with reference to a specific embodiment in conjunction with the accompanying drawings. FIG. 2 shows a typical system according to an embodiment of the present invention. In this system shown in FIG. 2, a host computer (such as a personal computer) 100 is connected to a printer 300 via a network 21.

Hardware Configuration of Document Processing System

Figure 7:
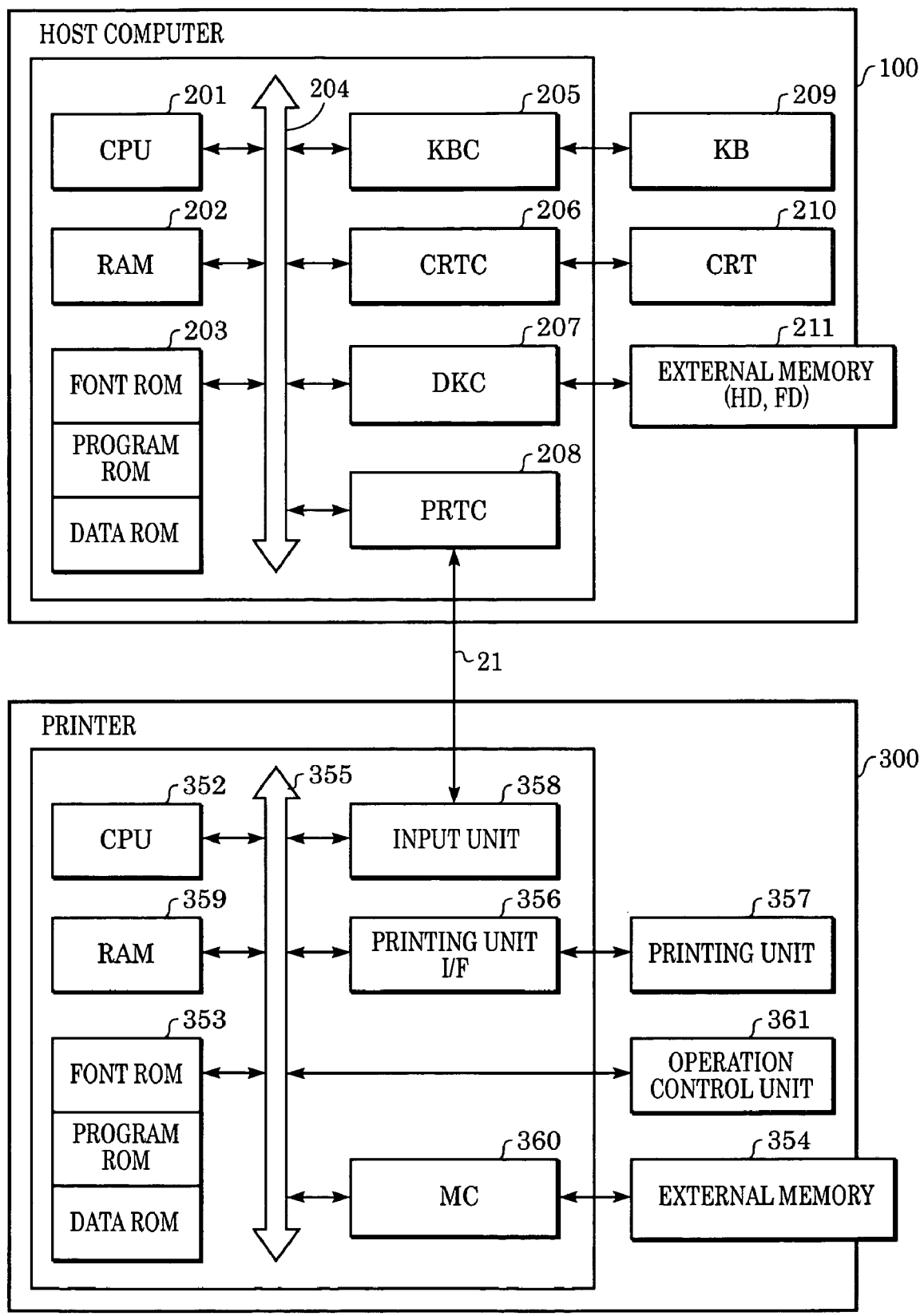
FIG. 7 is a block diagram showing a hardware configuration of a system according to an embodiment of the present invention.

FIG. 7 is a block diagram showing a configuration of a document processing system according to an embodiment of the present invention. The document processing system is not limited to the form shown in FIG. 7 and described herein, but the system may be realized in the form of a single apparatus in which all capabilities are integrated, in the form of a system including a plurality of devices, or in the form of a system including a plurality of devices connected with each other via a network, such as a local area network (LAN) or a wide area network (WAN), as long as all necessary capabilities are implemented in the system.

As shown in FIG. 7, the host computer 100 includes a central processing unit (CPU) 201, a random-access memory (RAM) 202, and a read-only memory (ROM) 203. In accordance with a document processing program stored in a program area of the ROM 203 or an external memory 211, the CPU 201 processes document data in the form of a mixture of graphics data, image data, text data, and table data (or spreadsheet data). The CPU 201 is also responsible for control of devices connected to the CPU 201 via a system bus 204. An operating system program (OS) serving as a control program to be executed by the CPU 201 is stored in a program area of the ROM 203 or the external memory 211. Font data used in the document processing is stored in a font area of the ROM 203 or the external memory 211. Other data used in the document processing is stored in a data area of the ROM 203 or the external memory 211. The RAM 202 is used by the CPU 202 as a main memory or a work area.

A keyboard controller (KBC) 205 controls a keyboard 209 or a pointing device (not shown) used to input a command or data. A CRT controller (CRTC) 206 controls a displaying operation of a display, such as a CRT (cathode ray tube) display (CRT) 210. A disk controller (DKC) 207 controls accessing to an external memory 211, such as a hard disk (HD) or a floppy disk (FD). A boot program, application programs, font data, user files, edit files, and a printer control command generation program (hereinafter also referred to as a printer driver) are stored in the external memory 211. A printer controller (PRTC) 208 for controlling communication with the printer 300 is connected to the printer 300 via a bidirectional interface 21.

The CPU 201 converts (rasterizes) outline font data into a form adapted to be displayed in a WYSIWYG (what you see is what you get) fashion on a display, such as CRT 210 and stores the resultant data in a display information RAM allocated, for example, in the RAM 202. In accordance with a command issued by a user by pointing to a particular location on the CRT 210 using a mouse cursor or the like, the CPU 201 executes specified data processing. When a user wants to execute printing, the user opens a print setting window provided by the printer driver to specify printing conditions including setting of the printer and selection of a print mode, as required.

The printer 300 is controlled by a CPU 352. The CPU 352 outputs an image signal as output information to a printing unit (printer engine) 357 (via a printing unit interface 356 connected to a system bus 355) in accordance with a control program stored in a program area of a ROM 353 or a control program stored in an external memory 354. In addition to the program area in which the control program for controlling the CPU 352 is stored, the ROM 353 also includes a font area in which font data used in generating output information is stored, and a data area in which information used by the host computer when no external memory 354 is connected to the printer 300 is stored.

The CPU 352 can communicate with the host computer 100 via an input unit 358 (connected to the host computer 100 via bidirectional interface 21) in order to transmit information indicating the internal status of the printer 300 or the like to the host computer 100. A RAM 359 is used by the CPU 352 as a main memory or a work area. The storage capacity of the RAM 359 can be extended by connecting an optional RAM to an extension port (not shown). The RAM 359 is also used as an area for use in generating output information, as an environmental data storage area, and as a NVRAM (non-volatile RAM). Access to the external memory 354, such as a hard disk or an IC card, is controlled by a memory controller (MC) 360. The external memory 354 is optionally used to store font data, an emulation program, form data, etc. An input unit 358 includes switches, LED (light emitting diode) indicators, and other elements necessary for operations via the operation panel.

Although only one external memory 354 is shown in the example shown in FIG. 7, a plurality of external memories 354 may be connected to the printer 300 to store optional font data in addition to the standard font data or a program for interpreting additional printer description languages. Although not shown in FIG. 7, the printer 300 may also include a NVRAM for storing data associated with a print mode specified via an operation control unit 361.

Software Configuration of System

Figure 3:
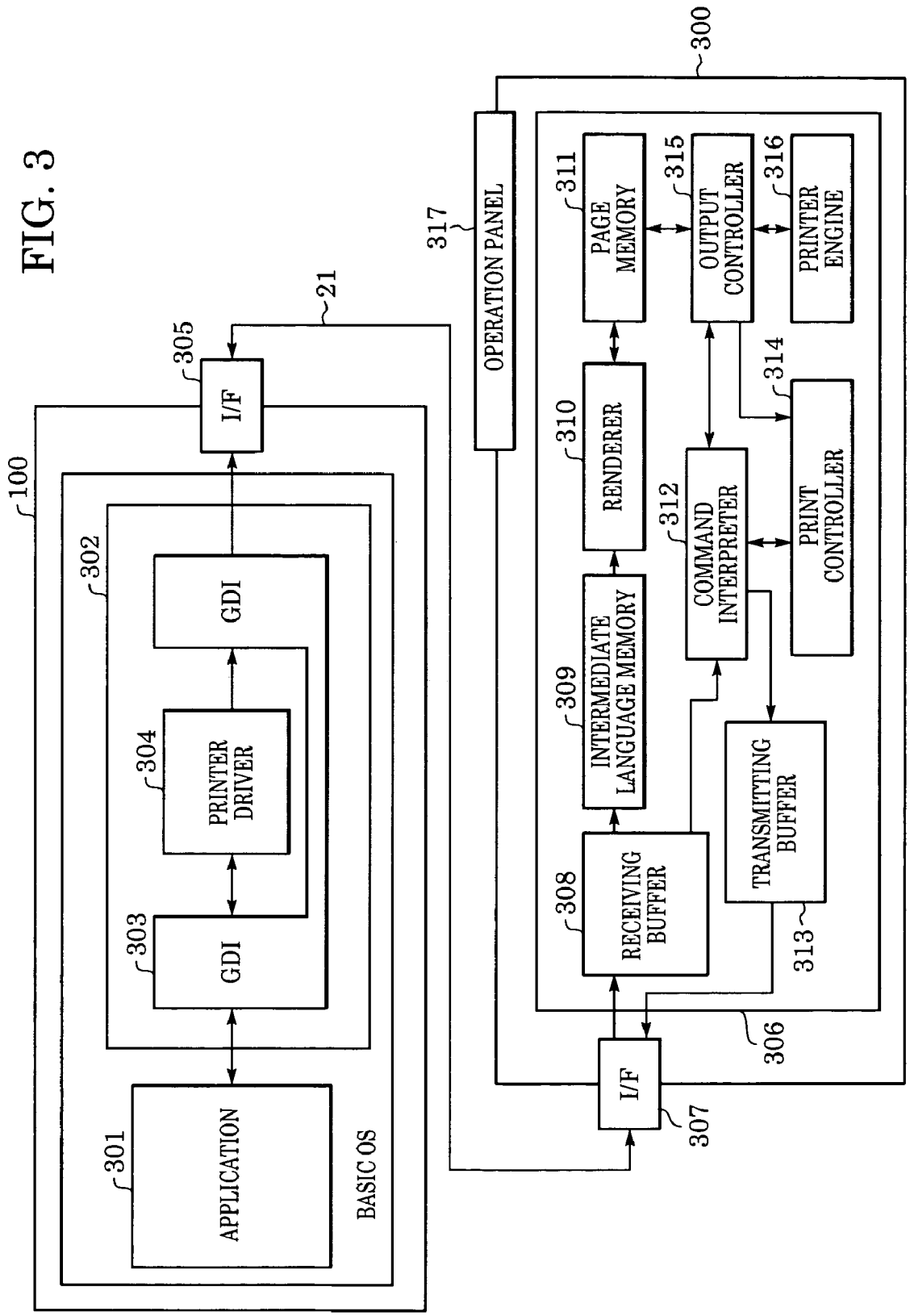
FIG. 3 is a block diagram showing a configuration of a system according to the present invention.

FIG. 3 is a block diagram showing a software configuration of the host computer (personal computer) 100 and the printer 300 shown in FIG. 2. The software configurations shown in FIG. 3 are implemented by executing programs on a host computer 100 and a printer 300 having the hardware configurations shown in FIG. 7. On the host computer 100, an application is executed and an operation is performed to output print information including print data and associated control codes to the printer 300. For the above purpose, the operation system and the printer driver run on the host computer 100.

The host computer 100 is constructed in the form of a computer system including an input device such as a keyboard and/or a mouse and a display monitor. The host computer 100 operates based on an operating system (OS) such as Microsoft® Windows® 2000 or Windows ME®. Although the OS is not limited to those described above, it is assumed in the present embodiment that commands of the graphic engine provided by the Windows OS are used. In many operating systems, inputting and outputting are virtualized, although there are differences in specific commands, and thus the concepts of the present embodiment of the invention can be easily implemented on other operating systems.

Of various functions provided by the OS on the host computer 100, functions relating to the present embodiment of the invention are application software 301, a graphic subsystem 302, and an interface 305 serving as an interface in communication with the printer 300. Specific examples of the application software 301 are a word processor program and a spreadsheet program that operate on the operating system. Note that the present invention can also be applied to other various applications as long as they have a print capability.

The graphic subsystem 302 includes a GDI 303 that is a part of the OS and a printer driver 304 that is a device driver dynamically linked to the GDI. If rendered data output from the printer driver 304 is returned as a print command in a particular format to the GDI 303, the GDI 303 transmits it as print data to be printed to the printer 300 via the interface 305 or transmits it as an intermediate file to the disk system (the external memory 211 shown in FIG. 7). Depending on the OS used, there are some differences in the name or the framework described above. However, such differences are not important in the present invention, as long as the printer driver according to the present invention can be implemented. In the host computer 100 having the above functional modules and having hardware components including the CPU, the ROM, the RAM, the HDD, and the input/output controller, the hardware components are controlled by the basic software called the operating system (OS), and applications programs and subsystem programs operates as functional modules on the operating system.

In the printer 300, a formatter/controller 306, also called a PDL controller, includes an interface (I/F) 307 for interfacing with the host computer 100 via bidirectional interface 21, a receiving buffer 308 for temporarily storing received data, a transmitting buffer 313 for temporarily storing data to be transmitted, a command interpreter 312 for analyzing print data, a print controller 314, an intermediate language memory 309, a renderer 310, a page memory 311, and a printer engine 316. The interface (I/F) 307 serves as communication means for transmitting and receiving print data to or from the host computer 100, using a protocol based on the IEEE-1284 standard. Note that the communication means is not limited to that described herein, but communication via a network using another protocol such as that based on IEEE-1394 standard may also be used, and there is no particular restriction on the connection form.

Print data received via the interface 307 is temporarily stored in the receiving buffer 308. The print data stored in the receiving buffer 308 is read by the command interpreter 312 or the renderer 310 (via the intermediate language memory 309) and processed as required. The command interpreter 312 is implemented by a control program adapted to handle a PDL command system or a print job control language used. In accordance with the result of analysis of print data in terms of drawing of characters, graphics, images, etc., the renderer 310 processes the print data. Commands such as a paper selection command, a reset command, etc., other than the drawing commands are handled by the print controller 314. The renderer 310 renders the print data including a text object, an image object, etc., into a final form and stores the rendered data in the page memory 311. In general, the formatter/controller 306 is implemented on the computer system using a central processing unit (CPU), a read only memory (ROM), and a random access memory (RAM). The processes of the respective modules may be performed in a time sharing manner using a multi task monitor (real-time OS), or may be performed independently by hardware controllers dedicated to respective processes.

An operation panel 317 is used for setting of the printer, and various kinds of information associated with setting are displayed on the operation panel 317. An output controller 315 converts the data stored in the page memory 311 into a video signal and supplies the resultant video signal to a printer engine 316. The printer engine 316 is a mechanical printing unit for forming a permanent visible image on paper in accordance with the received video signal.

The present embodiment of the invention is characterized in that when the printer driver receives a logical draw command from a higher-level layer (application or OS), the printer driver automatically selects an optimum processing mode depending on the received logical draw command and performs a process in the selected mode.

Processing of Logical Draw Command by Printer Driver

Figure 4:
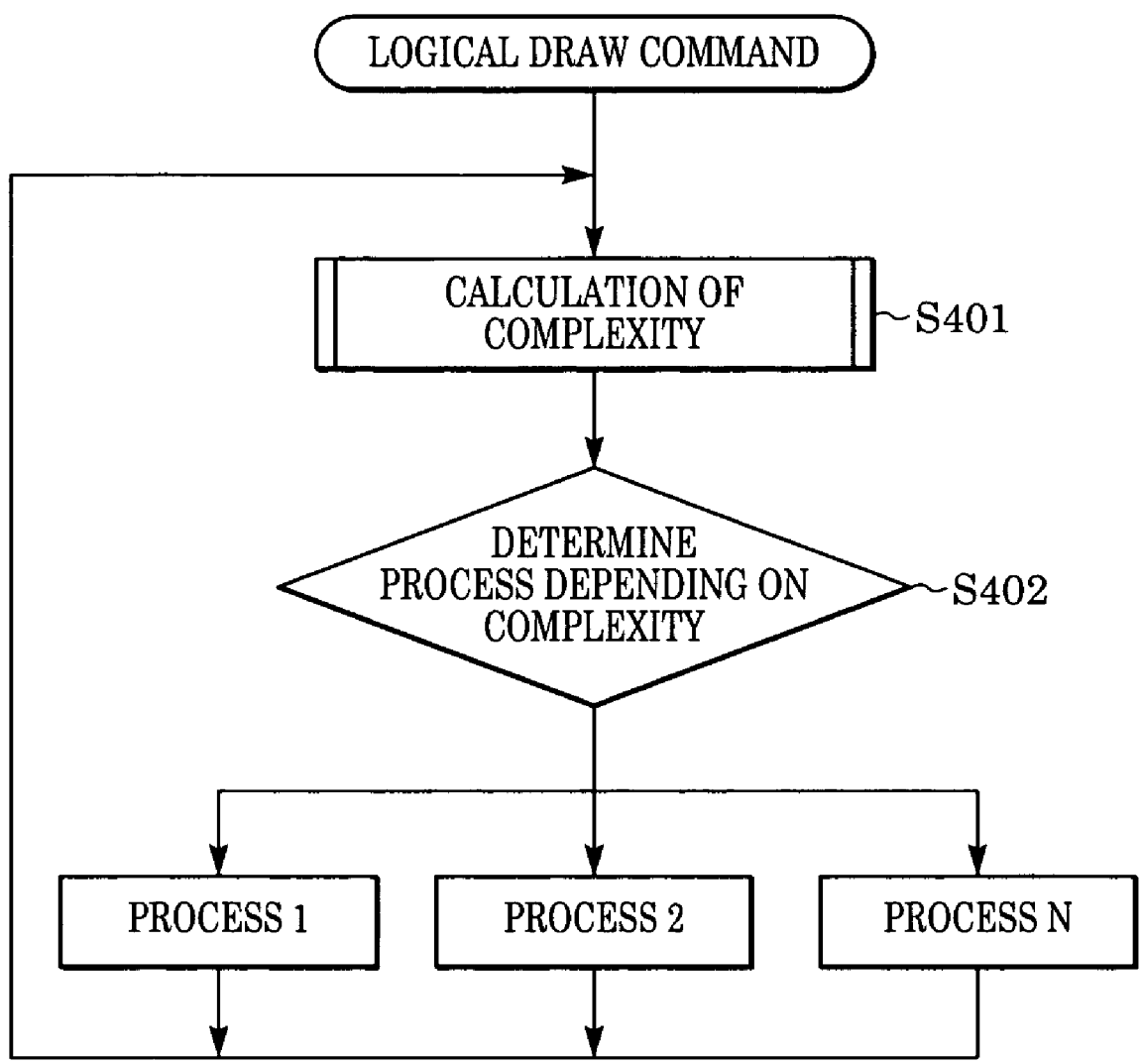
FIG. 4 is a flow chart showing a process according to the present invention.

A process according to the present embodiment is shown in FIG. 4 and described next. FIG. 4 shows a part of a procedure performed by the printer driver 304 on the host computer 100.

As shown in FIG. 4, when a printing operation is performed by the application 301, if the printer driver 304 receives a DDI logical draw command via the GDI 303, the printer driver 304, calculates the complexity δ of a clipping area (step S401). The complexity δ may be determined from the number of clipping path points, the size of the clipping area, or a particular external condition such as the type of the DDI. In the present embodiment, the complexity δ is determined from the number of clipping path points and the type of the DDI (a constant associated with the DDI type).

Depending on the determined complexity δ, the printer driver 304 selects a processing mode from first, second and third modes (step S402), and performs the process in the selected mode.

Figure 5:
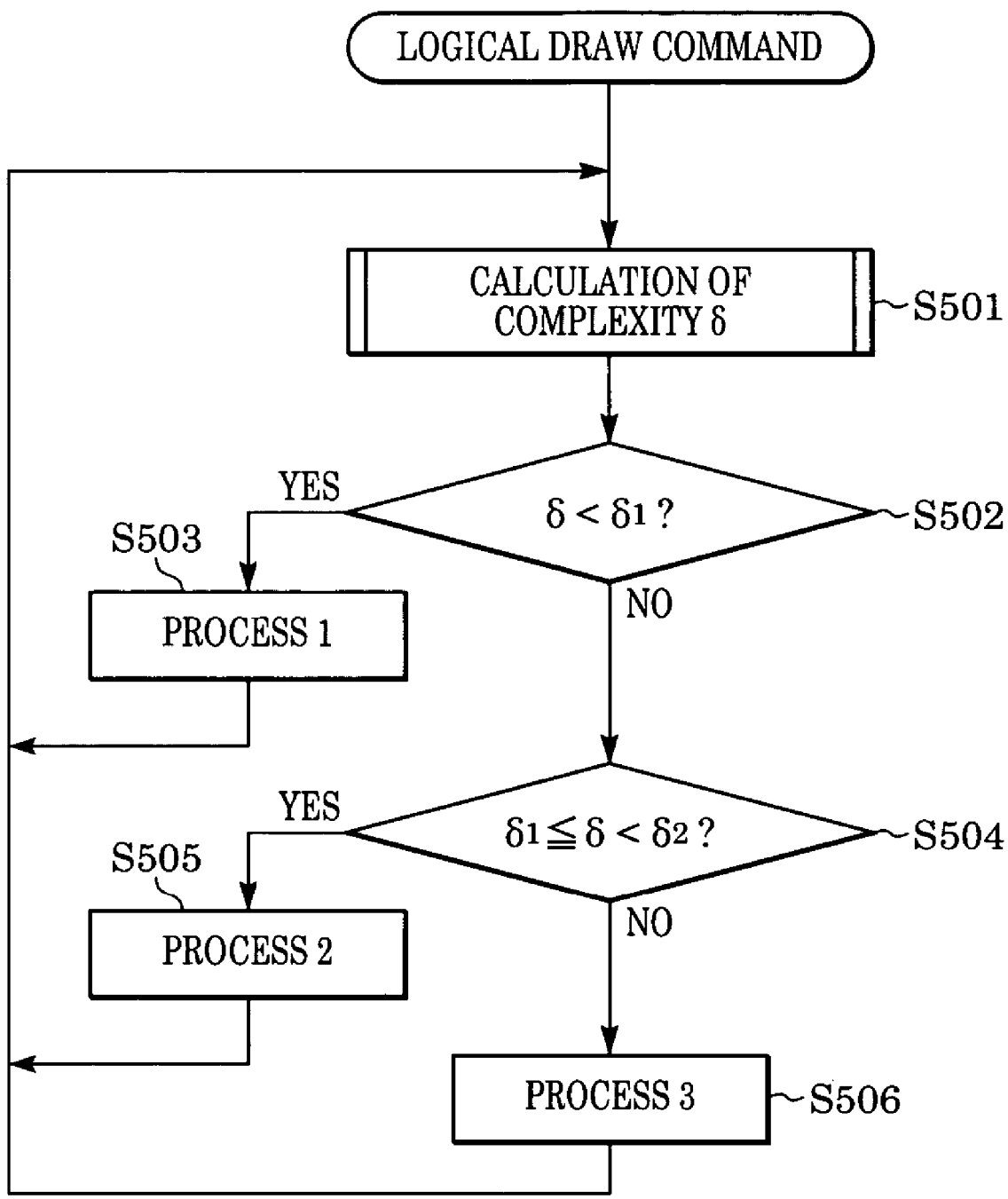
FIG. 5 is a flow chart showing a process according to an embodiment of the present invention.

In the present embodiment, threshold values δ1 and δ2 are defined for use in determining the degree of complexity in order to determine the processing mode. That is, the calculated complexity δ is compared with the threshold values δ1 and δ2, and the processing mode is selected from first, second and third modes, as shown in FIG. 5. As shown in FIG. 5, the process is performed in the first mode (step S503) when the complexity δ is less than the threshold value δ1 (yes in step S502), and the process is performed in the second mode (step S505) when the complexity δ is equal to or greater than the threshold value δ1 and less than the threshold value δ2 (yes in step S504). In the case in which the complexity δ is equal to or greater than the threshold value δ2 (no in step S502 and no in step S505), the process is performed in the third mode (step S506). Note that the threshold values and corresponding numbers of processing points may be set arbitrarily.

The process of calculating the complexity (in step S501) and selecting the mode of the process performed by the printer driver is described in further detail below. In the present embodiment, the complexity of the process performed by a device to handle the data output by the printer driver is predicted, and the data output by the printer driver is optimized. For the above purpose, when printing is executed the complexity is predicted in accordance with the following equation:

complexity $\delta = A \times$(number of clipping path points)$+ B \times$(DDI type constant)

In the above equation, A and B are parameters that determine the complexity. For example, A is set to 1 and B to 0, as will be described later with reference to a specific example. In this specific case, the complexity $\delta$ is represented directly by the number of clipping path points. The parameters A and B may be stored internally in the printer driver or may be determined based on external information given from an external file or via a user interface. In any case, it is necessary that the parameters A and B have been determined when the complexity is calculated. In the present embodiment, the values of the parameters A and B are predetermined depending on an environment in which the printer driver is used, and the predetermined values are stored in the printer driver so that the complexity can be determined when printing is performed. The parameters A and B serve as weighting factors for the number of clipping path points and the DDI-type constant, and the values are determined such that a greater value is given to a parameter having a greater influence on the processing load imposed by data output from the printer driver.

The number of clipping path points indicates the number of coordinate points that define a clipping area specified via a DDI logical drawing process. In the example shown in FIG. 1A, the clipping area 102 is defined, for example, by contour vectors. In this case, the number of coordinate points that define the clipping area is given by the number of coordinate points that define contour vectors. Thus, the number of coordinate points of the clipping area 102 is 12.

The DDI type constant is a constant determined by the type of a logical draw command, for example, an image draw command or a graphic draw command. A greater value is assigned to a command having greater complexity. The GDI draw commands include an image draw command and a pattern draw command.

The image draw command is represented by an operator and three operands such as "ImageBlt(Dst, Src, Clip)". Herein, the first operand Dst specifies a destination area in which an image should be drawn. For example, when the destination area is an area with a size of 100×100 with one vertex located at the origin (0, 0), the first operand Dst is given by coordinates (0, 0), (100, 0), (100, 100), and (0, 100) (that is, the destination area is a rectangular area defined by those coordinates). The second operand Src is a bit string representing a source image. For example, when the source image is image data with a size of 100×100 with one vertex located at the origin (0, 0), such as that shown in FIG. 8, the second operand Src is given by a bit string of the image data in the hatched area defined by coordinates (0, 0), (100, 0), (100, 100), and (0, 100). The third operand Clip is given by contour vectors that define a clipping area 802. For example, the third operand Clip is given by coordinates (25, 10), (75, 10), (75, 30), (65, 30), (65, 60), (55, 60), (55, 80), (45, 80), (45, 60), (35, 60), (35, 30), and (25, 30) representing the contour vectors that define the clipping area (closed area obtained when tracing the above coordinates in the above-described order) shown in FIG. 8 (having the same shape as that of the clipping area 100 shown in FIG. 1A).

The pattern draw command is represented as "PatBlt(Dst, Pat, Clip)". The first operand Dst specifies a destination area as with ImageBlt. For example, the first operand Dst is given by coordinates (0, 0), (100, 0), (100, 100), and (0, 100). The second operand Pat is a bit string representing a pattern. In the case of ImageBlt, the second operand Src is given by a bit string representing the entire source image. In contrast, in the pattern draw command, the second operand Pat is a bit string representing repetition units of a pattern. In a processing system that generates an image in response to receiving this command, the image is generated in the area specified by Dst by means of tiling according to the bit string of Pat representing the pattern. The third operand Clip is given by a set of coordinates of contour vectors representing a clipping area as with ImageBlt. This command is converted by the printer driver into an intermediate data such as "0 0 m 100 100 Pat D0". In this specific example, the command indicates that the point of interest should be moved to a point (0, 0) and an area having a size of 100×100 whose origin is located at (0, 0) should be filled with a pattern given by Pat. In a drawing system (such as a printer) that generates a pattern in accordance with a given pattern draw command, the pattern is generated by tiling, and thus the pattern draw process is more complicated than the image draw process. Thus, a greater value is assigned to the DDI type constant for PatBlt than for ImageBlt. For example, the DDI type constant for ImageBlt (image draw command) is given 10, and the DDI type constant for PatBlt (pattern draw command) is given 20. In this way, output data is generated by the printer driver in a different manner depending on the type of the DDI function. As described above, a greater value is given to the DDI type constant for a DDI function that needs more complicated processing to generate an image from output data. It is desirable to statically set the values of the DDI type constants from the point of view of simplification of process, although the values may be varied in accordance with a command issued by a user.

The output process in the first mode, the output process in the second mode, and the output process in the third mode performed in accordance with an exemplary embodiment are described below. The output process in the first mode is performed in step S503 shown in FIG. 5. In step S503, an input source image and a specified clipping area are generated directly according to a DDI command, and output from the printer driver. In this case, the process is performed in a similar manner to the process performed by the conventional printer driver. That is, a draw command to draw the image 103 shown in FIG. 1A and a clip command specifying the clipping area 104 are issued.

Specific examples of output data are described with reference to FIG. 8 and FIGS. 9 to 11.

Figure 8:
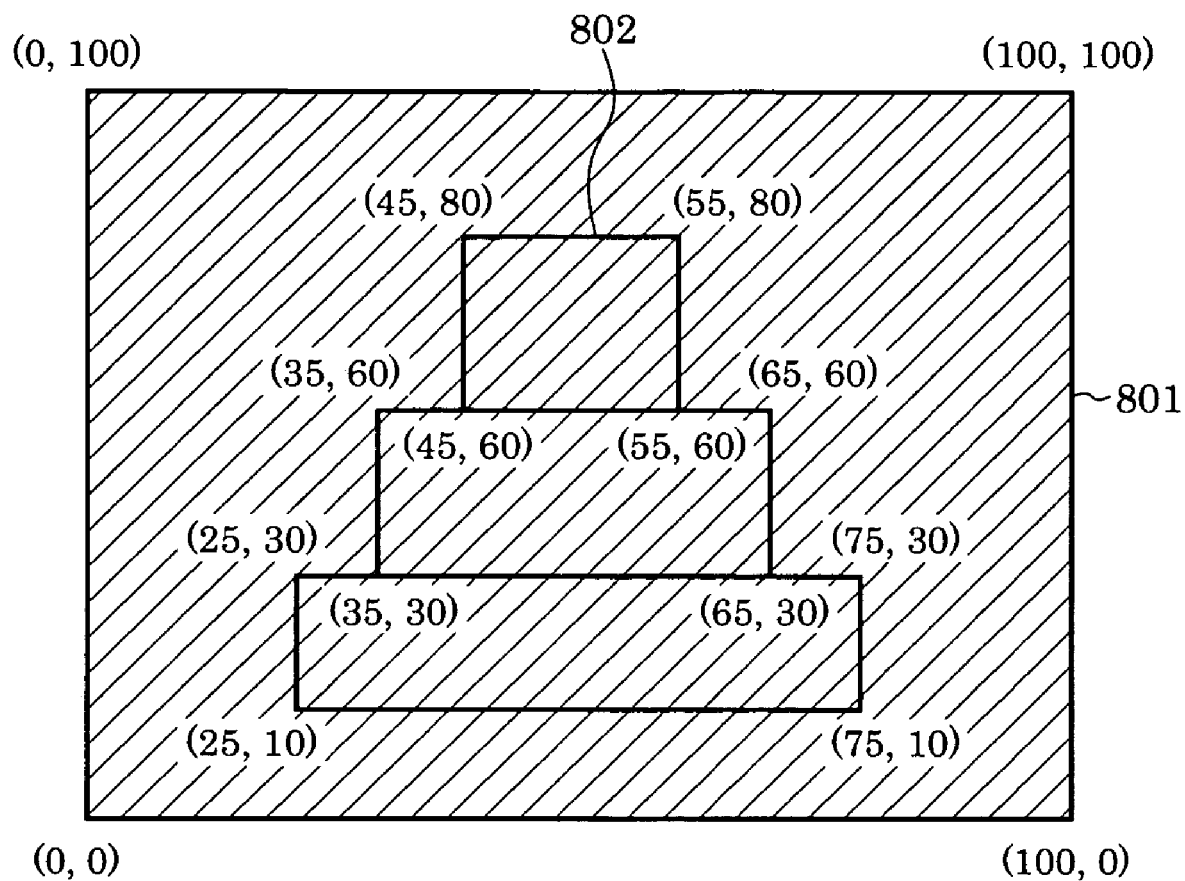
FIG. 8 is a diagram showing an example of a logical draw command input from an operating system according to an embodiment of the present invention.

FIG. 8 shows an example of data for a draw command that is similar to that shown in FIG. 1A but different in that specific values (coordinates) are given. The draw command shown in FIG. 8 may be represented by a Windows image draw command ImageBlt(Dst, Src, Clip). In this command, as described earlier, Dst specifies the destination area. In this specific example, Dst is given as coordinates (0, 0), (100, 0), (100, 100), and (0, 100), and the rectangular area defined by those coordinates is specified as the destination area in which an image should be drawn. Src is a bit string representing a source image. In this specific example, Src is given as a bit string representing image data in the hatched area defined by coordinates (0, 0), (100, 0), (100, 100), and (0, 100). Clip is given as a set of coordinates that define a clipping area. In the example shown in FIG. 8, a set of coordinates (25, 10), (75, 10), (75, 30), (65, 30), (65, 60), (55, 60), (55, 80), (45, 80), (45, 60), (35, 60), (35, 30), and (25, 30) is given as Clip. A closed area formed when tracing the above coordinate points in the above-described order is specified as the clipping area.

Figure 9:
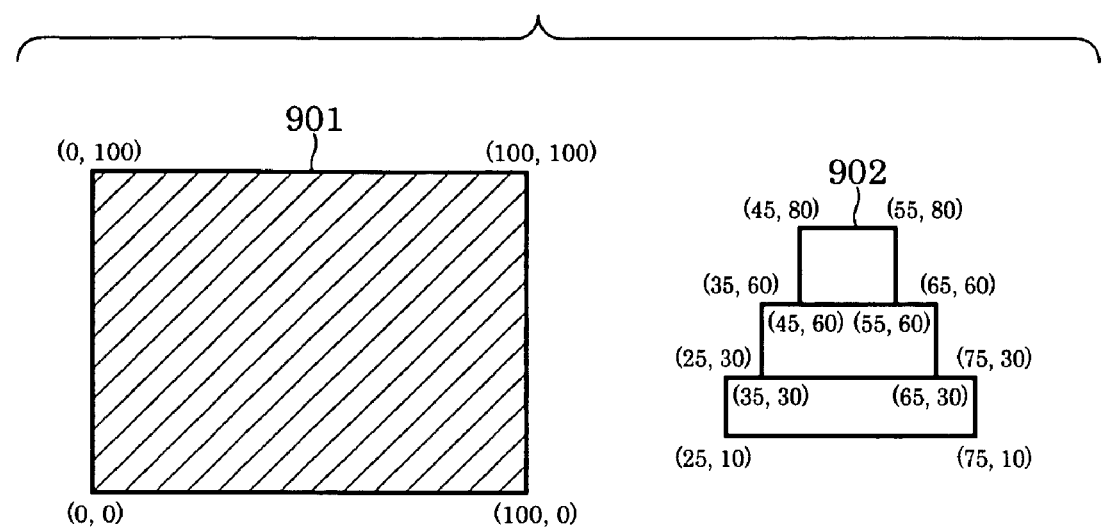
FIG. 9 is a diagram showing an example of a logical draw command output in the output process in the first mode according to an embodiment of the present invention.

Thus, in step S503, output data shown in FIG. 9 is generated in accordance with the given draw command. That is, data including a source image 901 and a clipping area 902 is generated. When the data shown in FIG. 9 is output from the printer driver, the data is in a form described below:
25 10 m 75 10 1 75 30 1 65 30 1 65 60 1 55 60 1 55 80 1 45 80 1 45 60 1 35 60 1 35 30 1 25 30 1 25 10 1 W 0 0 m 100 100 1 mg DO Herein, "25 10 m" indicates that the point of interest should be moved to a point (25, 10). More generally, "x y m" indicates that the point of interest should be moved to a point (x, y). 75 10 1 indicates that a line should be drawn along a path from the current point of interest to a specified point (point (75, 10) in this specific example). More generally, "x y l" indicates that a line should be drawn from the current point of interest to a point (x, y). After many similar "draw line" commands, "W" appears. "W" indicates that a line should be drawn from the current point of interest to the first point of interest so as to form a closed area that defines a clipping area. Of the output data in the form output from the printer driver, the above-described part corresponds to "Clip" in ImageBlt(Dst, Src, Clip). "0 0 m" appearing thereafter indicates that the point of interest should be moved to point (0, 0). "100 100" corresponds to "Dst" and specifies that the image size should be 100×100. "Img" is a bit string of image data corresponding to "Src" to be clipped. "DO" is an operator commanding that the overall image should be drawn. As described above, the format of the input DDI command is directly used in the output data generated in the output process in the first mode.

As can be seen from the above discussion, the output process in the first mode is simple for the printer driver, but the amount of output data increases with the number of points defining the clipping area. Furthermore, when an image is formed by processing the above-described output data supplied from the printer driver, the process of clipping the source image data is needed, which becomes more complicated with the increasing number of contour points of the clipping area.

The output process in the second mode is performed in step S505 in FIG. 5. In step S505, clipping of a source image in a clipping area specified by a DDI is performed by the printer driver. Thus, output data supplied by the printer driver has a simpler form including no clipping area. "Clipping" refers to a process of dividing image data (source image data) to be clipped into a plurality of rectangular elements (in the example shown in FIG. 1A, a clipping area 104 is divided into rectangular elements 104a, 104b, and 104c). As a result of clipping the image area 103 with the clipping area 104, three images 105, 106, and 107 (shown in FIG. 1B) are generated and output by the printer driver.

Figure 11:
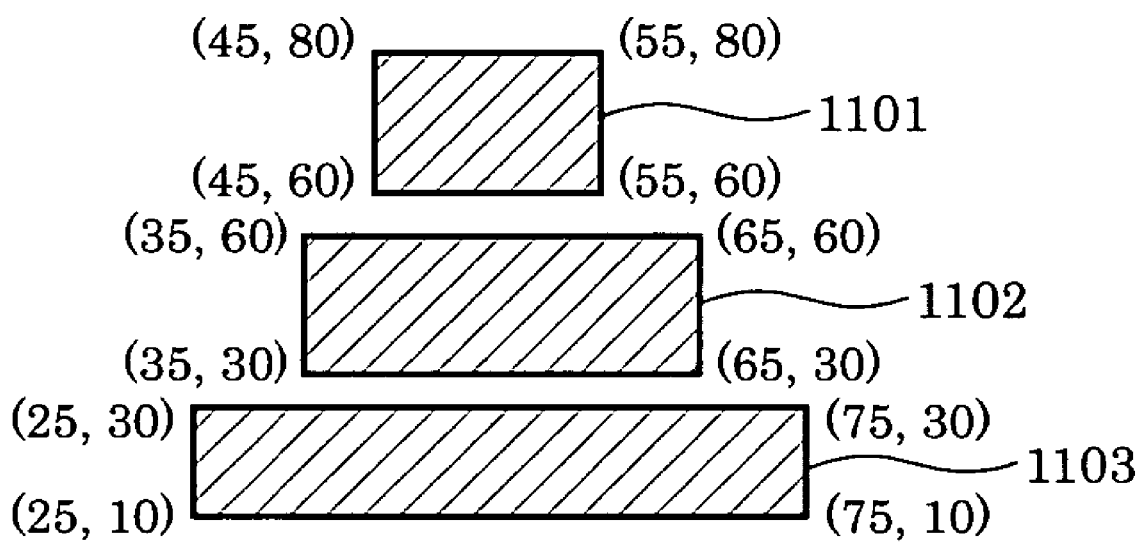
FIG. 11 is a diagram showing an example of a logical draw command output in the output process in the second mode according to an embodiment of the present invention.

FIG. 11 shows an example of output data obtained by clipping the draw command data shown in FIG. 8. In this example, the following three commands are generated as a result of the clipping: a command associated with an image element 1101 (Img1) in a rectangular area defined by vertices (45, 60), (55, 60), (55, 80), and (45, 80), a command associated with an image element 1102 (Img2) in a rectangular area defined by vertices (35, 30), (65, 30), (65, 60), and (35, 60), and a command associated with an image element 1103 (Img3) in a rectangular area defined by vertices (25, 10), (75, 10), (75, 30), and (25, 30). More specifically, the first command output by the printer driver is in the form of "45 60 m 10 20 Img1 DO", the second command is "35 30 m 30 30 Img2 DO", and the third command is "25 10 m 50 20 Img3 DO". The meanings of those commands are similar to those described above with reference to FIG. 9. In the first command, "45 60 m" indicates that the current point of interest should be moved to point (45, 60), and "10 20" specifies that the image size should be 10×20. "Img1" is a bit string representing an image 1101 in a rectangular area defined by the above-described points (coordinates). DO operator commands that the rectangular image specified by the first command should be drawn. The second and third commands are similar in meaning to the first command.

As described above, the output process in the second mode performed by the printer driver is simpler than the output process in the first mode, but the amount of output data increases with the number of clipped rectangular image elements. When an image is formed by processing the output data supplied by the printer driver, the process of forming each image element is needed, which becomes more complicated with an increasing number of contour points of the clipping area. However, the process is to simply form specified image elements and does not include a process of clipping. Thus, the process in the second mode is not complicated compared with the process in the first mode.

The output process in the third mode is performed in step S506 in FIG. 5. In step S506, the printer driver converts the clipping area 104 into a bit mask image 109 (FIG. 1C) taking into account a valid area of the clipping area 104 and generates a logical AND command to calculate the logical AND between the source image and the bit mask image 109. The mask image 109 is produced by converting the resolution of the clipping area 104 to that corresponding to the size of the source image 103 and defining the valid area corresponding to the black area. By calculating the logical AND bit by bit between the source image 103 and the mask image 109 whose black area has a value of 1, a desired output can be obtained.

Figure 10:
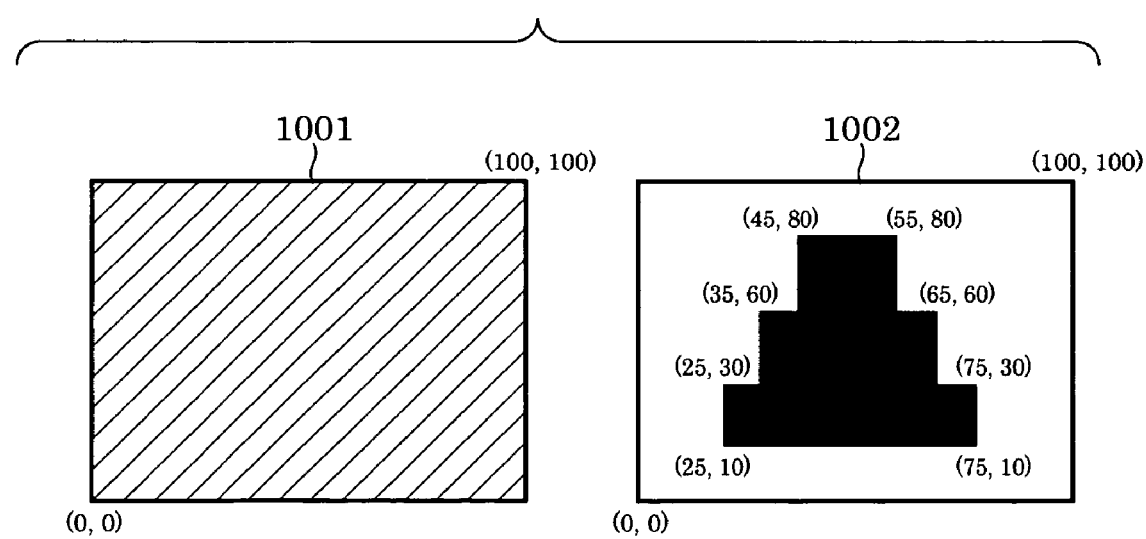
FIG. 10 is a diagram showing an example of a logical draw command output in the output process in the third mode according to an embodiment of the present invention.

FIG. 10 shows an example of output data produced by representing the draw command data shown in FIG. 8 in the form of a combination of source data and mask data. In this example, if the mask data 1002 corresponding to a clipping area is denoted by Mask1, "0 0 m Mask1 100 100 Img DO" is obtained as the output data generated in the output process in the third mode. "Mask1" is the mask image 1002 denoted by the black area, shown in FIG. 10, corresponding to the clipping area, and "Img" is the source image 1001. Thus, this command indicates that an image should be generated in an area having a size of 100×100 whose origin is located at (0, 0) by calculating the logical AND between Mask1 and Img.

As described above, if the data size of the image data is constant, the amount of output data generated in the output process in the third mode is constant regardless of the shape of the clipping area, although the output data includes two image data. The process of forming an image based on the output data supplied by the printer driver is to determine the logical AND of bit maps. However, the printer driver has to generate bit map data from the clipping area data, and thus the output process in the third mode performed by the printer driver becomes more complicated than the process in the first mode or the process in the second mode.

The procedure performed in the first, second and third modes to convert a draw command supplied by the operating system into an output command is described below. In the output process in the first mode, the given command and parameters are simply replaced. In the output process in the second mode, the given clipping area is divided into a set of rectangular areas whose sides extends in a main scanning direction or a sub scanning direction of a final image (the dividing may be performed by slicing the clipping area along the main scanning direction at contour points), and the locations and the sizes of the respective rectangular areas are extracted from the source image and described as parameters in the draw command. In the output process in the third mode, the mask image is generated in the above-described manner.

Specific Examples of Processes

The process according to the present embodiment is described in further detail with reference to the flow chart shown in FIG. 5. Herein, let us assume that the above-described constants are set such that A=1, B=0, $\delta 1$=15, and $\delta 2$=18, and the values of those constants are stored in a memory of the printer driver. That is, in this specific example, the complexity is given by the number of clipping path points, and the degree of the complexity, that is, the number of clipping path points, is evaluated with respect to threshold values $\delta 1$=15 and $\delta 2$=18.

For example, when an image shown in FIG. 1 is drawn, the process is performed as follows. In step S501, the complexity $\delta$ of image processing including a clipping process or the like required to handle a logical draw command received from a higher-level process (application or OS) is calculated. In this specific example, the number of clipping path points is given by the number of vertices of the clipping area 104 shown in FIG. 1, and thus the number of clipping path points is 12. Therefore, the complexity is calculated as $\delta$=1×12=12. In the next step S502, it is determined whether the complexity $\delta$ is less than $\delta 1$. In this specific case, it is determined that $\delta$ (12) is less than $\delta 1$ (15), and thus the process proceeds from step S502 to step S503. In step S503, the printer driver directly outputs a clip path of a given input image. In this case, the output data generated by the printer driver includes an image draw command and a clip path command. More specifically, draw commands to draw images denoted by reference numerals 103 and 104 in FIG. 1 are output.

Figure 6:
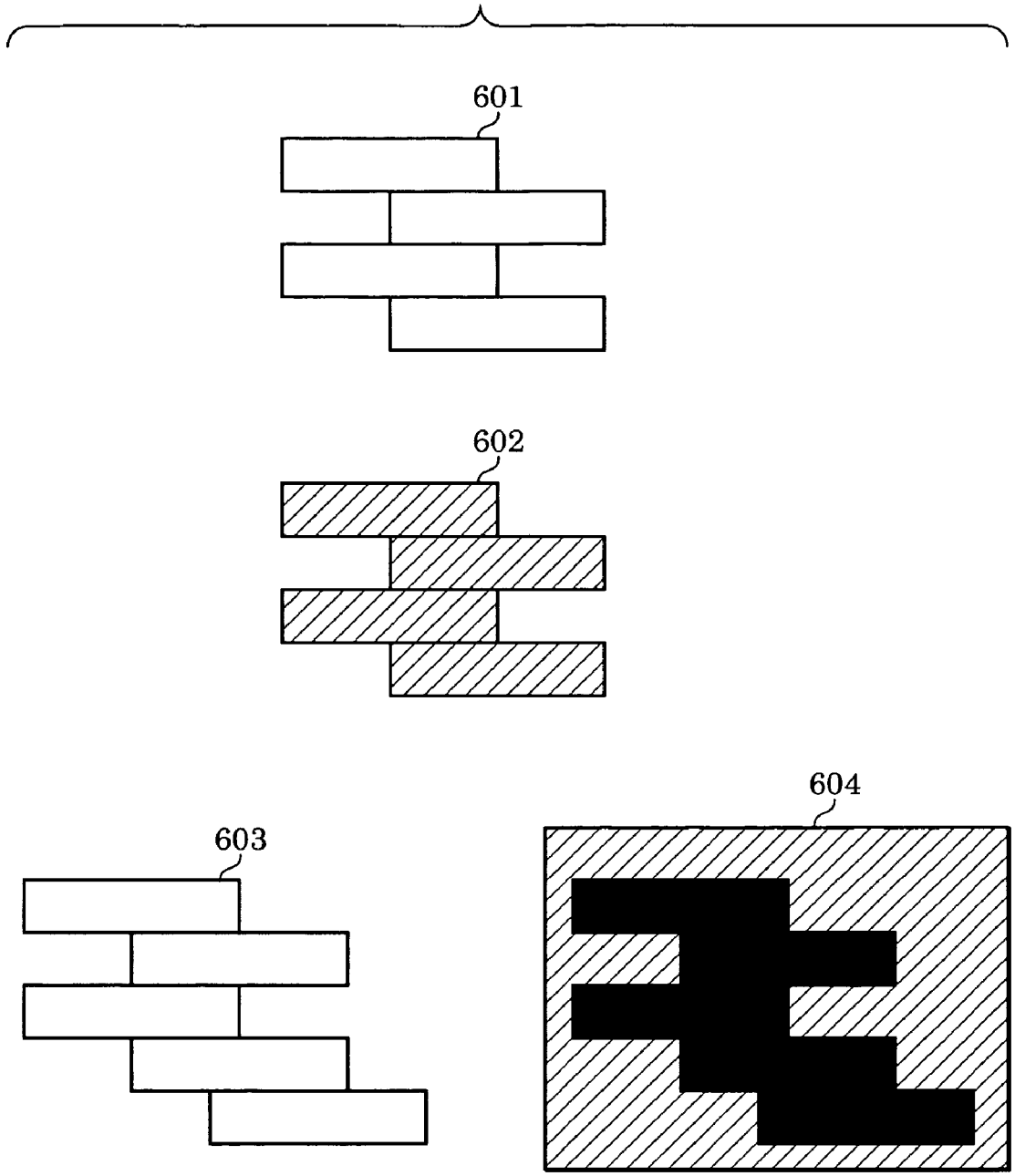
FIG. 6 is a diagram showing an example of a logical draw command according to an embodiment of the present invention.

When an image 601 shown in FIG. 6 is specified as the clipping area, the process is performed as follows. Let us assume herein that image data 103 is supplied together with data indicating the clipping area 601 shown in FIG. 6 to the printer driver from a higher-level process (application or OS). In this specific example, the number of clipping path points is given by the number of vertices of the clipping area 601, and thus the number of clipping path points is 16. Therefore, the complexity is calculated as $\delta$=1×16=16 (step S501 of FIG. 5). In this case, $\delta$ (16) is not less than $\delta 1$, and thus the process proceeds from step S502 to step S504. In step S504, it is determined that $\delta$ (16) is equal to or greater than $\delta 1$ (15) and $\delta$ (16) is less than $\delta 2$ (18), and thus the process proceeds from step S504 to step S505. In step S505, the printer driver performs the process in the second mode such that image data is clipped with an outermost-contour clipping area. In this specific example, the output data generated by the printer driver includes four image output commands denoted by reference numeral 602.

On the other hand, when an image shown 603 in FIG. 6 is specified as the clipping area, the process is performed as follows. Let us assume herein that image data 103 is supplied, together with data indicating the clipping area 603 shown in FIG. 6, to the printer driver from a higher-level process (application or OS). In this specific example, the number of clipping path points is given by the number of vertices of the clipping area 603 shown in FIG. 6, and thus the number of clipping path points is 20. Therefore, the complexity is calculated as $\delta$=1×20=20 (step S501). In this case, $\delta$ (20) is not less than $\delta 1$(15) and thus process proceeds from step S502 to step S504. In step S504, it is determined that $\delta$ (20) is greater than $\delta 2$ (18), and thus the process proceeds from step S504 to step S506. In step S506, the printer driver performs the output process in the third mode. More specifically, the printer driver generates a mask image corresponding to the clipping area and outputs the image data and the mask image data. That is, the output data generated by the printer driver is in the form of a combination of an image draw command and a mask image 604 (in FIG. 6).

In the present embodiment, as described above, when the printer driver performs processing in response to a logical draw command received from a higher-level layer (application or OS), the printer driver not only outputs a clipping command but also generates output data including an adaptively optimized draw command, thus achieving an optimum printing system. Herein, the output data including an optimized draw command (including associated parameters) refers to output data optimized such that the complexity of the process needed to handle the output data is minimized or such that the data size of the output data is minimized.

For example, let us assume that a host computer A capable of performing processing at a particular speed is connected to a printer B, and that the printer B performs printing in accordance with data output by a printer driver running on the host computer A. Let us further assume that the performance of the printer becomes low when the number of path points of a clipping area is greater than a particular threshold value. In this situation, the printing throughput can be maximized by properly selecting the parameter A associated with the clipping area relative to the parameter (threshold value) determined depending on the printer. On the other hand, for a printer C having a capability of performing logical operations associated with an image at a higher speed than performing clipping operations, the value of $\delta 2$ may be selected such that the printer driver generates output data in the form of logical image data.

Second Embodiment

In a second embodiment described herein, a system similar to that described above with reference to FIGS. 2, 3, and 7 is used. The complexity parameters for the second embodiment are determined as follows:

complexity $\delta$=$A$×(number of clipping path points)+ $B$×(DDI type constant)

Herein, unlike the first embodiment, the complexity constants are set in the printer driver such that A=0, B=1, $\delta 1$=10, and $\delta 2$=18. In this case, the complexity is given directly by the DDI type constant. Note that the DDI type constant is predetermined for each DDI type. For example, we assume that the DDI includes a "PatWrite" function (corresponding to PatBlt in the first embodiment) for outputting a pattern image, and an "ImageWrite" (corresponding to ImageBlt in the first embodiment) for outputting a color image. In this case, the DDI type constant for the "PatWrite" and the DDI type constant for the "ImgeWrite" are preset in the printer driver. For example, the DDI type constants are determined such that the DDI type constant=15 for the "PatWrite" and the DDI type constant=0 for "Image Write". If the DDI type constants are determined in this way, the complexity calculated in step S501 in FIG. 5 has a value other than 0 only when the logical draw command received from the higher-level process (application or OS) is a PatWrite DDI command. For example, when a PatWrite DDI command to write the image 101 shown in FIG. 1 is given to the printer driver, the complexity is calculated as $\delta=1\times15=15$.

In the next step S502, it is determined whether the complexity $\delta$ is less than $\delta1$. In this specific case, because $\delta$ is not less than $\delta1$, processing proceeds from step S502 to step S504. Because $\delta$ is greater than or equal to $\delta1$ and $\delta$ is less than $\delta2$, the process proceeds from step S504 to step S505. Thus, when a PatWrite DDI is given, the printer driver always performs the output process in the second mode, that is, the clipping process in step S505. In step S505, image data is clipped with an outermost-contour clipping area, and the result is output from the printer driver. When an Image-Write DDI command is given, the complexity $\delta$ is always calculated as 0, and thus the process is always performed in the first mode.

In the present embodiment, as described above, the complexity is determined depending on the DDI command type, and the processing mode to be performed is selected depending on the determined complexity. Thus, a most suitable processing mode is selected depending on the DDI command type. In the above-described example, when input data is given in the form of a PatWrite command, the printer driver performs a pattern filling process, and the result is output in the form of a set of image data draw commands from the printer driver. When an image is formed in accordance with this output data, the pattern filling process is no longer necessary, and thus the processing load is reduced.

In the present embodiment, as described above, when the printer driver performs processing in response to a logical draw command received from a higher-level layer (application or OS), the printer driver not only outputs a clipping command but also performs a clipping process in an optimum manner depending on the complexity determined for each DDI type. The printer driver generates output data adapted to the DDI type thus achieving an optimum printing system.

For example, when a host computer A capable of performing processing at a particular speed is connected to a printer B, and the printer B performs printing in accordance with data output by a printer driver running on the host computer A, if it is known that the performance of this printer becomes low when processing a pattern image, the printing throughput can be maximized by controlling the printer driver such that output data generated by the printer driver does not include a pattern image and a clipping area. On the other hand, for a printer C having a capability of performing logical operations associated with an image at a higher speed than performing clipping operations, the DDI type constant may be determined such that the printer driver generates output data in the form of logical image data.

In the present embodiment of the invention, when a logical draw command is given from a higher-level program, the complexity of the given logical draw command is determined from at least one of the type of the command and a logical draw area, and a processing mode used to generate optimum output data is determined depending on the complexity thus maximizing the overall throughput of the printing system as a whole. Note that the optimum output data refers to data optimized such that the data imposes a minimum processing load on the printing system.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus for generating data in a predetermined format in accordance with a logical draw command, the information processing apparatus comprising:

complexity determination means for determining complexity of the logical draw command, on the basis of the logical draw command and associated one or more parameters thereof; and data generation means for, depending on the determined complexity, generating first output data including a draw command defining a drawing area and a clipping area output command defining a clipping area; second output data including a draw command to draw one or more rectangular areas constituting an image area obtained by clipping the drawing area with the clipping area; or third output data including a draw command to mask the drawing area with mask data corresponding to an area other than the clipping area, wherein an image, formed based on the first output data, the second output data, or the third output data generated by the data generation means, is output by output means.

2. The information processing apparatus according to claim 1, wherein the complexity determination means determines the complexity based on a constant corresponding to the type of the logical draw command or based on the number of contour points of the image clipping area included as a parameter in the logical draw command.

3. The information processing apparatus according to claim 1, wherein the data generation means generates first output data when the complexity is less than a first threshold, second output data when the complexity is equal to or greater than the first threshold and less than a second threshold, or third output data when the complexity is equal to or greater than the second threshold.

4. An information processing apparatus for generating data in a predetermined format in accordance with a logical draw command, the information processing apparatus comprising:

complexity determination means for determining complexity of the logical draw command such that a constant corresponding to the type of the logical draw command or the number of contour points of an image clipping area included as a parameter in the logical draw command is employed as the complexity; and data generation means for generating first output data including a draw command defining a drawing area included in the logical draw command and a clipping area output command defining a clipping area if the complexity is less than a first threshold; second output data including a draw command to draw one or more rectangular areas obtained by dividing an image area obtained by clipping the drawing area with the clipping area if the complexity is equal to or greater than the first threshold and less than a second threshold; or mask data for masking an area other than the clipping area and further generating third output data including a draw command to draw an image obtained as the logical multiplication of the mask data and the drawing area if the complexity is equal or greater than the second threshold, wherein an image, formed based on the first output data, the second output data or the mask data generated by the data generation means, is output by output means.

5. An information processing method for generating data in a predetermined format in accordance with a logical draw command, the information processing method comprising:

a complexity determination step of determining complexity of the logical draw command, on the basis of the logical draw command and associated one or more parameters thereof; and a data generation step of depending on the determined complexity, generating first output data including a draw command defining a drawing area and a clipping area output command defining a clipping area; second output data including a draw command to draw one or more rectangular areas constituting an image area obtained by clipping the drawing area with the clipping area; or third output data including a draw command to mask the drawing area with mask data corresponding to an area other than the clipping area, wherein an image, formed based on the first output data, the second output data or the third output data generated in the data generation step, is output in an output step.

6. The information processing method according to claim 5, wherein, in the complexity determination step, the complexity is determined based on a constant corresponding to the type of the logical draw command or based on the number of contour points of the image clipping area included as a parameter in the logical draw command.

7. The information processing method according to claim 5, wherein, in the data generation, first output data is generated when the complexity is less than a first threshold, second output data is generated when the complexity is equal to or greater than the first threshold and less than a second threshold, and third output data is generated when the complexity is equal to or greater than the second threshold.

8. An information processing method for generating data in a predetermined format in accordance with a logical draw command, the information processing method comprising:

a complexity determination step of determining complexity of the logical draw command such that a constant corresponding to the type of the logical draw command or the number of contour points of an image clipping area included as a parameter in the logical draw command is employed as the complexity;

a first data generation step of generating first output data including a draw command defining a drawing area included in the logical draw command and a clipping area output command defining a clipping area if the complexity is less than a first threshold;

a second data generation step of generating second output data including a draw command to draw one or more rectangular areas obtained by dividing an image area obtained by clipping the drawing area with the clipping area if the complexity is equal to or greater than the first threshold and less than a second threshold; and a third data generation step of generating mask data for masking an area other than the clipping area and further generating third output data including a draw command to draw an image obtained as the logical multiplication of the mask data and the drawing area if the complexity is equal or greater than the second threshold, wherein an image, formed based on the first output data generated by the first data generation step, the second output data generated by the second data generation step or the mask data generated by the third data generation step, is output in an output step.

9. A computer-readable medium having a program stored thereon for causing a computer to generate data in a predetermined format in accordance with a logical draw command, the program comprising:

complexity determination code for determining complexity of the logical draw command, on the basis of the logical draw command and associated one or more parameters thereof; and data generation code for, depending on the determined complexity, generating first output data including a draw command defining a drawing area and a clipping area output command defining a clipping area; second output data including a draw command to draw one or more rectangular areas constituting an image area obtained by clipping the drawing area with the clipping area; or third output data including a draw command to mask the drawing area with mask data corresponding to an area other than the clipping area, wherein an image, formed based on the first output data, the second output data or the third output data generated by the data generation code, is output by output code.

10. A computer-readable medium having a program stored thereon for causing a computer to generate data in a predetermined format in accordance with a logical draw command, the program comprising:

complexity determination code for determining complexity of the logical draw command such that a constant corresponding to the type of the logical draw command or the number of contour points of an image clipping area included as a parameter in the logical draw command is employed as the complexity; and data generation code for generating first output data including a draw command defining a drawing area included in the logical draw command and a clipping area output command defining a clipping area if the complexity is less than a first threshold; second output data including a draw command to draw one or more rectangular areas obtained by dividing an image area obtained by clipping the drawing area with the clipping area if the complexity is equal to or greater than the first threshold and less than a second threshold; or mask data for masking an area other than the clipping area and further generating third output data including a draw command to draw an image obtained as the logical multiplication of the mask data and the drawing area if the complexity is equal or greater than the second threshold, wherein an image, formed based on the first output data, the second output data, or the mask data generated by the data generation code, is output by output code.

* * * * *